US011265785B2

United States Patent
Hong

(10) Patent No.: US 11,265,785 B2
(45) Date of Patent: Mar. 1, 2022

(54) METHOD AND APPARATUS FOR IDENTIFYING USER DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 21 days.

(21) Appl. No.: 16/766,181

(22) PCT Filed: Nov. 29, 2017

(86) PCT No.: PCT/CN2017/113616
§ 371 (c)(1),
(2) Date: May 21, 2020

(87) PCT Pub. No.: WO2019/104539
PCT Pub. Date: Jun. 6, 2019

(65) Prior Publication Data
US 2020/0288368 A1 Sep. 10, 2020

(51) Int. Cl.
*H04W 36/14* (2009.01)
*H04W 52/02* (2009.01)
(52) U.S. Cl.
CPC ....... *H04W 36/14* (2013.01); *H04W 52/0229* (2013.01)
(58) Field of Classification Search
CPC ............. H04W 52/0229; H04W 36/14; H04W 64/006; H04W 36/32; H04W 84/005
See application file for complete search history.

(56) References Cited

U.S. PATENT DOCUMENTS

2004/0053626 A1 3/2004 Yagi
2010/0113019 A1 5/2010 Jeong et al.
(Continued)

FOREIGN PATENT DOCUMENTS

CN 101873566 A 10/2010
CN 101982995 A 3/2011
(Continued)

OTHER PUBLICATIONS

Supplementary European Search Report in the European Application No. 17933334.9, dated Sep. 2, 2020.
(Continued)

*Primary Examiner* — Marcos L Torres
(74) *Attorney, Agent, or Firm* — Finnegan, Henderson, Farabow, Garrett & Dunner, L.L.P.

(57) ABSTRACT

A method for identifying a user device includes: receiving uplink messages sent at least twice by the same user device; on the basis of the uplink messages sent at least twice, determining remote radio unit (RRU) positional information of each RRU that receives an uplink message; judging whether a proportion of a number of different pieces of the RRU positional information among at least two pieces of the RRU positional information to a total number of the at least two pieces of the RRU positional information reaches a preset proportion threshold; when the ratio does not reach the preset ratio threshold, determining that the user device is a common user device; and when the ratio reaches the preset ratio threshold, determining that the user device is a fast-moving user device.

15 Claims, 11 Drawing Sheets

(56) References Cited

U.S. PATENT DOCUMENTS

| | | | |
|---|---|---|---|
| 2014/0141785 A1 | 5/2014 | Wang et al. | |
| 2014/0335865 A1* | 11/2014 | Zhang | H04W 36/0061 |
| | | | 455/436 |
| 2015/0172970 A1 | 6/2015 | Dai et al. | |
| 2015/0271789 A1 | 9/2015 | Gao et al. | |
| 2017/0201919 A1 | 7/2017 | Chong et al. | |
| 2017/0201925 A1 | 7/2017 | Chong et al. | |
| 2021/0160753 A1* | 5/2021 | Zhang | H04W 48/18 |

FOREIGN PATENT DOCUMENTS

| | | |
|---|---|---|
| CN | 102300279 A | 12/2011 |
| CN | 102647766 A | 8/2012 |
| CN | 102938917 A | 2/2013 |
| CN | 103442402 A | 12/2013 |
| CN | 105519153 A | 4/2016 |
| CN | 106792960 A | 5/2017 |
| CN | 108401512 A | 8/2018 |
| EP | 2 621 221 A1 | 7/2013 |

OTHER PUBLICATIONS

International Search Report in the International Application No. PCT/CN2017/113616, dated Aug. 29, 2018.
English translation of the Written Opinion of the International Search Authority in the International Application No. PCT/CN2017/113616, dated Aug. 29, 2018.

\* cited by examiner

METHOD AND APPARATUS FOR IDENTIFYING USER DEVICE

CROSS REFERENCE TO RELATED APPLICATIONS

This application is a national phase application based on PCT/CN2017/113616, filed Nov. 29, 2017, the content of which is incorporated herein by reference.

TECHNICAL FIELD

The disclosure relates to the technical field of communication, and particularly to a method and device for identifying user equipment (UE).

BACKGROUND

In related technologies, with a rapid development in the high-speed railway technology and a rapid deployment of the high-speed railway, an increasing number of users choose to travel by the high-speed train. One development goal of a high-speed-railway dedicated network is to ensure a normal communication for the users who travel by the high-speed train. It is possible for both fast-moving UE and non-fast-moving UE to access the high-speed-railway dedicated network. If the non-fast-moving UE accesses the high-speed-railway dedicated network, resources of the fast-moving UE may be occupied, and the performance of the latter will be affected. Therefore, what needs to be done first is to identify whether the UE is non-fast-moving UE, also referred to as a common UE. However, no effective solutions have been provided to solve the above problem in the art.

SUMMARY

A method and device for identifying UE are provided in embodiments of the disclosure. The technical solutions are described as below.

A first aspect according to the embodiments of the disclosure provides a method for identifying the UE, the method including:

uplink messages transmitted at two or more different times by a same UE are received;

Remote Radio Unit (RRU) positional information of each RRU that receives an uplink message is determined according to the uplink messages transmitted at two or more different times;

it is judged whether a proportion of a number of different pieces of the RRU positional information among at least two pieces of the RRU positional information to a total number of the at least two pieces of the RRU positional information reaches a preset proportion threshold;

the UE is determined as a common UE in response to the proportion not reaching the preset proportion threshold; or the UE is determined as a fast-moving UE in response to the proportion reaching the preset proportion threshold.

The technical solutions in the embodiment of the disclosure may have beneficial effects as follows. In the embodiment of the disclosure, it can be determined whether the multiple uplink messages reported by the same UE reach a same RRU. If the multiple uplink messages reach the same RRU, it can be determined that a position of the UE remains substantially unchanged, or the UE moves within a small area, so that the UE can be determined as a common UE. If the multiple uplink messages reach different RRUs, it can be determined that the position of the UE changes a lot and therefore the UE is fast-moving UE. In the embodiment of the disclosure, it can be identified whether the UE is fast-moving or common UE, so that different processing can be performed on different UE to improve a network performance or a communication effect of the UE.

In an embodiment of the disclosure, the UE is in an idle state.

The operation of receiving the uplink messages transmitted at two or more different times by the same UE includes:

uplink wake-up signals transmitted at two or more different times by the same UE is received.

The technical solutions in the embodiment of the disclosure may have beneficial effects as follows. In the embodiment of the disclosure, the UE in the idle state can be made to report the uplink wake-up signal through which the RRU of the UE is determined. A detailed implementation solution is provided in terms of the UE in the idle state. Thus, it is possible to identify whether the UE in the idle state is fast-moving or common UE.

In an embodiment of the disclosure, the method further includes:

before the uplink messages transmitted at two or more different times by the same UE are received, a first broadcast message is transmitted to the UE for instructing the UE to transmit the uplink wake-up signal.

The technical solutions in the embodiment of the disclosure may have beneficial effects as follows. In the embodiment of the disclosure, the UE in the idle state can be instructed or triggered by the first broadcast message to transmit the uplink wake-up signal. That is to say, a process of identifying the UE is initiated by the first broadcast message.

In an embodiment of the disclosure, the first broadcast message includes at least one of a preset interval length or a preset cycle length, herein the interval length is configured to indicate a time interval after expiration of which the UE transmits the uplink wake-up signal, and the cycle length is configured to indicate a cycle period according to which the UE transmits the uplink wake-up signal periodically.

The technical solutions in the embodiment of the disclosure may have beneficial effects as follows. In the embodiment of the disclosure, the UE can be configured with the interval length or the cycle length. In this way, transmission of the uplink wake-up signal can be configured flexibly in terms of time.

In an embodiment of the disclosure, the first broadcast message includes a format of the uplink wake-up signal and a resource position for transmitting the uplink wake-up signal.

The technical solutions in the embodiment of the disclosure may have beneficial effects as follows. In the embodiment of the disclosure, the UE can also be configured with the format of the uplink wake-up signal and the resource position for transmitting the uplink wake-up signal. In this way, transmission of the uplink wake-up signal can be configured flexibly in terms of resources.

In an embodiment of the disclosure, the method further includes:

a second broadcast message is transmitted to the UE for instructing the UE to stop transmitting the uplink wake-up signal.

The technical solutions in the embodiment of the disclosure may have beneficial effects as follows. In the embodiment of the disclosure, the UE in the idle state can be made to stop transmitting the uplink wake-up signal by the second broadcast message, which can stop the identification process.

In an embodiment of the disclosure, the UE is in an activated state.

The operation of receiving the uplink messages transmitted at two or more different times by the same UE includes:

uplink data transmitted at two or more different times by the same UE is received.

The technical solutions in the embodiment of the disclosure may have beneficial effects as follows. In the embodiment of the disclosure, the RRU of the UE can be determined according to the uplink data reported by the UE in the activated state. A detailed implementation solution is provided for the UE in the activated state. Thus, it is possible to identify whether the UE in the idle state is fast-moving UE or common UE.

In an embodiment of the disclosure, the method further includes:

in response to determining that the UE is common UE, the common UE is handed over to a public Long Term Evolution (LTE) network.

The technical solutions in the embodiment of the disclosure may have beneficial effects as follows. In the embodiment of the disclosure, the common UE can be handed over to the public LTE network to reduce occupancy of resources of a high-speed mobile network. In this way, a good communication can be ensured for the fast-moving UE.

A second aspect according to the embodiments of the disclosure provides a device for identifying UE, applied to a base station for a high-speed-railway dedicated network, the device including:

a receiving module, configured to receive uplink messages transmitted at two or more different times by a same UE;

a positioning module, configured to determine, according to the uplink messages transmitted at two or more different times, RRU positional information of each RRU that receives an uplink message;

a comparing module, configured to judge whether a proportion of a number of different pieces of the RRU positional information among at least two pieces of the RRU positional information to a total number of the at least two pieces of the RRU positional information reaches a preset proportion threshold;

a first determining module, configured to determine the UE as a common UE in response to the proportion not reaching the preset proportion threshold; or a second determining module, configured to determine the UE as a fast-moving UE in response to the proportion reaching the preset proportion threshold.

In an embodiment of the disclosure, the UE is in an idle state;

and the receiving module includes:

a first receiving sub-module, configured to receive uplink wake-up signals transmitted at two or more different times by the same UE.

In an embodiment of the disclosure, the device further includes:

a first transmitting module, configured to, before receiving the uplink messages transmitted at two or more different times by the same UE, transmit a first broadcast message to the UE for instructing the UE to transmit the uplink wake-up signal.

In an embodiment of the disclosure, the first broadcast message includes at least one of a preset interval length or a preset cycle length, herein the interval length is configured to indicate a time interval after expiration of which the UE transmits the uplink wake-up signal, and the cycle length is configured to indicate a cycle period according to which the UE transmits the uplink wake-up signal periodically.

In an embodiment of the disclosure, the first broadcast message includes a format of the uplink wake-up signal and a resource position for transmitting the uplink wake-up signal.

In an embodiment of the disclosure, the device further includes:

a second transmitting module, configured to transmit a second broadcast message to the UE for instructing the UE to stop transmitting the uplink wake-up signal.

In an embodiment of the disclosure, the UE is in an activated state;

and the receiving module includes:

a second receiving sub-module, configured to receive uplink data transmitted at two or more different times by the same UE.

In an embodiment of the disclosure, the device further includes:

a handover module, configured to, in response to determining that the UE is common UE, hand over the common UE to a public LTE network.

A third aspect according to the embodiments of the disclosure provides a device for identifying UE, applied to a base station for a high-speed-railway dedicated network, the device including:

a processor;

a memory configured to store instructions executable by the processor, herein the processor is configured to:

receive uplink messages transmitted at two or more different times by a same UE;

determine, according to the uplink messages transmitted at two or more different times, RRU positional information of each RRU that receives an uplink message;

judge whether a proportion of a number of different pieces of the RRU positional information among at least two pieces of the RRU positional information to a total number of the at least two pieces of the RRU positional information reaches a preset proportion threshold;

determine the UE as a common UE in response to the proportion not reaching the preset proportion threshold; or determine the UE as a fast-moving UE in response to the proportion reaching the preset proportion threshold.

A fourth aspect according to the embodiments of the disclosure provides a computer-readable storage medium having stored thereon computer instructions that, when executed by a processor, cause above method for identifying UE to be executed.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
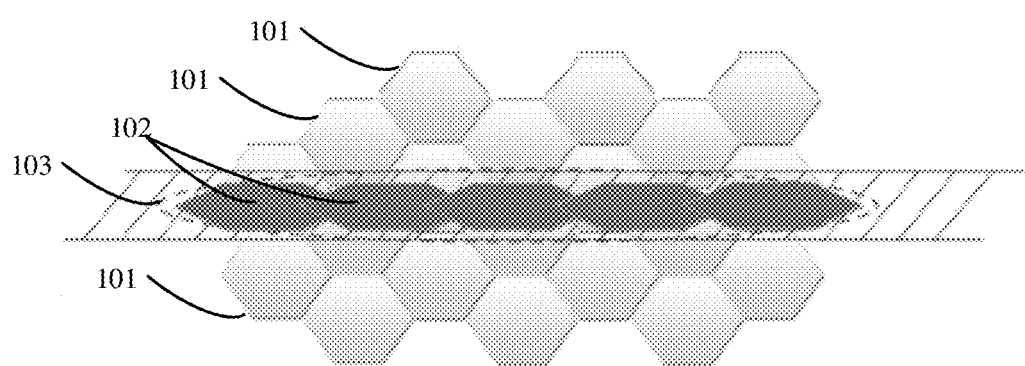
FIG. 1 is a schematic diagram of a network according to an exemplary embodiment.

In related technologies, a high-speed-railway dedicated network is specifically designed in the industry in order to provide a good communication for fast-moving UE. The fast-moving UE can have a relatively good communication quality in the high-speed-railway dedicated network. In the high-speed-railway dedicated network, multiple Remote Radio Units (RRUs) are cascaded as a cell to serve mobile users of the high-speed train. As illustrated in FIG. 1, the RRUs are represented by hexagons, among which light-colored hexagons 101 represent RRUs in the public LTE network and dark-colored hexagons 102 represent RRUs in the high-speed-railway dedicated network. An area surrounded by a dotted curve 103 in FIG. 1 represents a cell. A same position may be covered by both the high-speed-railway dedicated network and the public LTE network.

It is possible for both the fast-moving UE and the non-fast-moving UE to get connected to the high-speed-railway dedicated network. If the non-fast-moving UE accesses the high-speed-railway dedicated network, resources of the fast-moving UE may be occupied, and the performance of the latter will be affected. Therefore, what needs to be done first is to identify whether the UE is the non-fast-moving UE, also referred to as a common UE. However, no effective solutions have been provided to solve the above problem in the industry.

In order to solve the above problem, in the embodiments of the disclosure, an RRU, which receives a message reported by UE, is determined. If messages reported at multiple times by the same UE are received by a same RRU, the UE is determined as a common UE; otherwise, the UE is determined as fast-moving UE. Therefore, the UE can be identified with regard to its moving speed.

In the embodiment of the disclosure, a base station for the high-speed-railway dedicated network includes multiple RRUs. Each of the RRUs covers UE within a certain range. Multiple RRUs cover a cell. When the UE is in an area covered by an RRU, a message transmitted by the UE to the base station is received by the RRU that provides coverage for the UE. The base station can determine the RRU which receives the message and further determine positional information of the RRU. In the embodiment of the disclosure, the base station identifies the UE in the cell, and both the identified common UE and the fast-moving UE are in the high-speed-railway dedicated network. With respect to the fast-moving UE, the common UE can be regarded as non-fast-moving UE.

Figure 2:
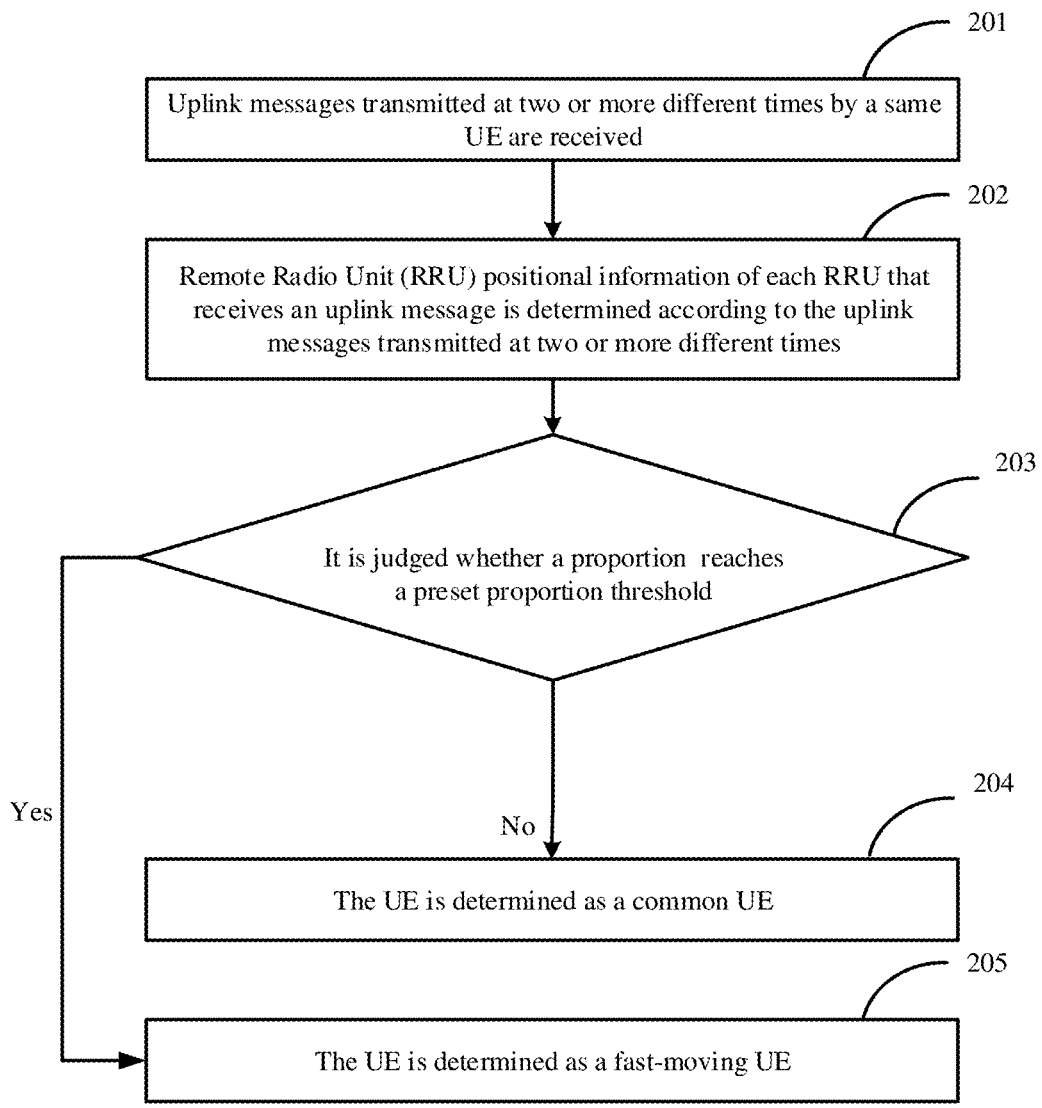
FIG. 2 is a flowchart of a method for identifying UE according to an exemplary embodiment.

FIG. 2 is a flowchart of a method for identifying UE according to an exemplary embodiment. The method for identifying the UE is applied to a base station for a high-speed-railway dedicated network. As illustrated in FIG. 2, the method includes following operations 201 to 205.

The base station for the high-speed-railway dedicated network performs a following identification process on UE in a cell for which coverage is provided by the base station.

In operation 201, uplink messages transmitted at two or more different times by a same UE are received.

In operation 202, RRU positional information of each RRU that receives an uplink message is determined according to the uplink messages transmitted at two or more different times.

In operation 203, it is judged whether a proportion of a number of different pieces of the RRU positional information among at least two pieces of the RRU positional information to a total number of the at least two pieces of the RRU positional information reaches a preset proportion threshold.

In operation 204, the UE is determined as a common UE in response to the proportion not reaching the preset proportion threshold.

In operation 205, the UE is determined as a fast-moving UE in response to the proportion reaching the preset proportion threshold.

In the embodiment of the disclosure, the base station for the high-speed-railway dedicated network determines whether a position of the UE changes greatly according to the uplink messages transmitted at two or more different times by the same UE. If the uplink messages reach different RRUs, that is to say, the multiple pieces of the RRU positional information obtained by the base station are different, it can be determined that UE has a great change in its position and is fast-moving UE suitable for camping on the high-speed-railway dedicated network. If the uplink messages reach a same RRU, that is to say, the multiple pieces of the RRU positional information obtained by the base station are same, it can be determined that the UE has a slight change in its position and is common UE not suitable for camping on the high-speed-railway dedicated network.

In the embodiment of the disclosure, the proportion threshold can be set according to an actual need. For example, when the proportion threshold is equal to 80%, that is to say, a minority of the at least two pieces of the RRU positional information are allowed to be same, and when the proportion of the number of different pieces of the RRU positional information among the at least two pieces of the RRU positional information to the total number of the at least two pieces of the RRU positional information reaches 80%, the UE is determined as the fast-moving UE. For example, if the total number of the at least two pieces of the RRU positional information is 5 and 4 pieces of which are different, the UE is determined as the fast-moving UE. For another example, if the proportion threshold is equal to 100% and all of the at least two pieces of the RRU positional information are different, the UE is determined as the fast-moving UE. For example, if the total number of the at least two pieces of the RRU positional information is 5, all of which are different, the UE is determined as the fast-moving UE.

In the embodiment of the disclosure, the proportion threshold is set based on m and n, and is equal to n/m, where m is a sampling number of the RRU positional information, which is also the total number of the at least two pieces of positional information; n and is the number of different pieces of the RRU positional information among the at least two pieces of the RRU positional information. The number of actually obtained different pieces of the RRU positional information is compared with n, if the number of actually obtained different pieces of the RRU positional information reaches n. the UE is determined as the fast-moving UE.

The base station for the high-speed-railway dedicated network can make statistics on uplink messages received at recently m times for a piece of UE, that is to say, the base station obtains m pieces of the RRU positional information. If n of the m pieces of the RRU positional information are different, the UE is determined as the fast-moving UE. Both m and n are preset parameters that are integers not less than 2, where n is less than or equal to m. For example, m can range between 2 and 5.

For example, if m is equal to 5, n is equal to 2. If among 5 pieces of the obtained RRU positional information, RRU positional information 1, RRU positional information 2 and RRU positional information 3 are same while RRU positional information 4 is same as RRU positional information 5 but different from the RRU positional information 1, then there are two different pieces of RRU positional information among the RRU positional information 1 to 5, thus the number n of different pieces of positional information satisfies n=2, that is to say, the proportion reaches the proportion threshold. In this case, the UE can be determined as the fast-moving UE.

For another example, if m is equal to 5, n is also equal to 5. If among 5 pieces of obtained RRU positional information, RRU positional information 1 to RRU positional information 5 are different from one another, then there are 5 different pieces of RRU positional information, thus the number n of different pieces of positional information satisfies n=5, that is to say, the proportion reaches the proportion threshold. In this case, the UE can be determined as the fast-moving UE. If two of the 5 pieces of the RRU positional information are same, the number of the different pieces of the RRU positional information is 4, thus the number is less than n, that is to way, the proportion is less than the proportion threshold. In this latter case, the UE can be determined as the common UE.

The base station for the high-speed-railway dedicated network can perform the above identification process on the UE, which is just handed over to a local cell or just camps on a local cell through cell reselection, or the base station can perform the process on all the UE in the cell on a periodic or on-demand basis.

In an embodiment of the disclosure, the UE is in an idle state.

Operation 201 includes operation A.

In operation A, uplink wake-up signals transmitted at two or more different times by the same UE are received.

In the embodiment of the disclosure, a position of the UE in the idle state can be obtained using the uplink wake-up signals. More specifically, the position of the UE is determined by checking whether the uplink wake-up signals reach a same RRU. Therefore, a solution is provided for the UE in the idle state.

In an embodiment of the disclosure, the method further includes operation B.

In operation B, before the uplink messages transmitted at two or more different times by the same UE are received, a first broadcast message is transmitted to the UE for instructing the UE to transmit the uplink wake-up signal.

In the embodiment of the disclosure, the base station for the high-speed-railway dedicated network can instruct, using a broadcast message, the UE in the idle state to report the uplink wake-up signal. When needing to identify a property of the UE in the cell, the base station can transmit the first broadcast message to trigger a process of identifying the UE.

In an embodiment of the disclosure, the first broadcast message includes at least one of a preset interval length or a preset cycle length. The interval length is configured to indicate a time interval after expiration of which the UE transmits the uplink wake-up signal, and the cycle length is configured to indicate a cycle period according to which the UE transmits the uplink wake-up signal periodically.

In the embodiment of the disclosure, the first broadcast message includes at least one of the interval length or the cycle length. The base station for the high-speed-railway dedicated network can instruct the UE to transmit the uplink wake-up signal according to the interval length if the UE receives the first broadcast after expiration of the time interval, and the base station can also instruct the UE to transmit the uplink wake-up signal periodically according to the cycle length (a period length of a cycle). In addition, the base station for the high-speed-railway dedicated network can flexibly configure at least one of the interval length or the cycle length according to a current occupancy of network resources. As a result, the base station for the high-speed-railway dedicated network can receive the uplink wake-up signal with an increased success rate, and thus identify the UE more accurately. For example, the interval length or the cycle length can be smaller when fewer of the network resources are occupied and can be greater when more of the network resources are occupied. For another example, the interval length is about 1 second and the cycle length is about 3 seconds.

In an embodiment of the disclosure, the first broadcast message includes a format of the uplink wake-up signal and a resource position for transmitting the uplink wake-up signal.

In the embodiment of the disclosure, the base station for the high-speed-railway dedicated network can also configure the format of the uplink wake-up signal and the resource position for transmitting the uplink wake-up signal, so as to instruct the UE to generate the uplink wake-up signal in the configured format and transmit the uplink wake-up signal in the configured resource position. In addition, the base station for the high-speed-railway dedicated network can flexibly configure the format of the uplink wake-up signal and the resource position for transmitting the uplink wake-up signal according to the current occupancy of the network resources. As a result, the base station for the high-speed-railway dedicated network can receive the uplink wake-up signal with an increased success rate, and thus identify the UE more accurately.

In an embodiment of the disclosure, the method further includes operation C.

In operation C, a second broadcast message is transmitted to the UE for instructing the UE to stop transmitting the uplink wake-up signal.

In the embodiment of the disclosure, the base station for the high-speed-railway dedicated network can instruct the UE to stop transmitting the uplink wake-up signal and identifying the UE using the second broadcast signal. Thus, occupancy of network resources can be reduced.

In an embodiment of the disclosure, the UE is in an activated state.

Operation 201 includes operation D.

In operation D, uplink data transmitted at two or more different times by the same UE are received.

In the embodiment of the disclosure, the UE in the activated state always has data interaction with the base station. Therefore, the base station for the high-speed-railway dedicated network can determine the position of the UE according to the uplink data transmitted by the UE. Specifically, the position of the UE is determined by checking whether the uplink data transmitted at two or more different times by the same UE reach a same RRU. Therefore, a solution is provided for the UE in the activated state.

In an embodiment of the disclosure, the method further includes operation E.

In operation E, in response to a determination that the UE is common UE, the common UE is handed over to a public LTE network.

In the embodiment of the disclosure, the base station for the high-speed-railway dedicated network can remove the common UE from the high-speed-railway dedicated network and hand it over to the public LTE network. Thus, it is possible to decrease occupied resources of the high-speed-railway dedicated network and ensure a good communication for the fast-moving UE. The common UE is more suitable for performing communication in the public LTE network that can guarantee communication quality for the common UE.

As the UE in the idle state occupies few network resources, there is no need to reselect the public LTE network for the common UE in the idle state. Certainly, the public LTE network can also be reselected for the common UE in the idle state.

A process of implementing the above is to be described below in detail using several embodiments.

Figure 3:
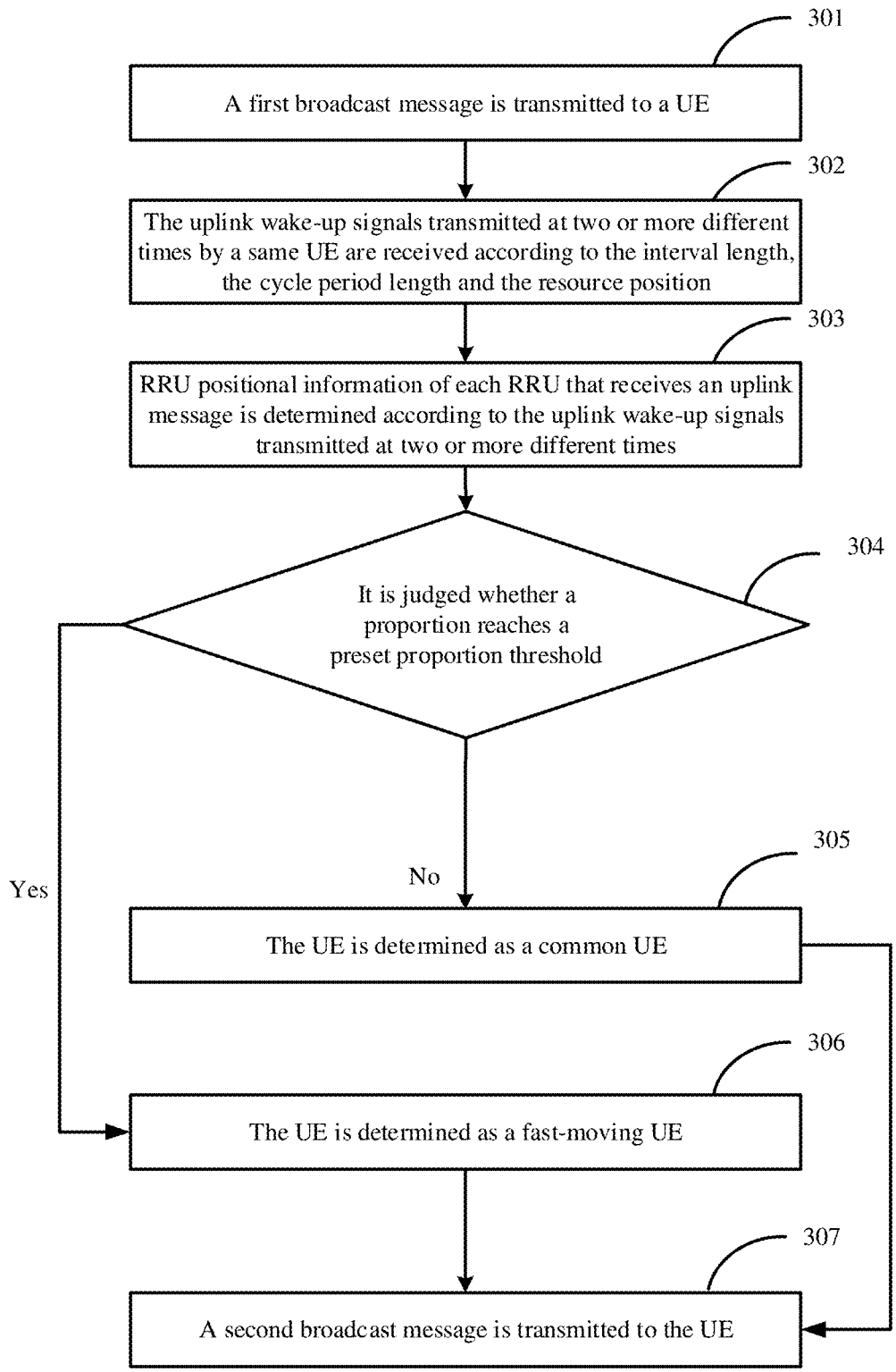
FIG. 3 is a flowchart of a method for identifying UE according to a first specific embodiment.

FIG. 3 is a flowchart of a method for identifying UE according to an exemplary embodiment. The method for identifying the UE is applied to a base station for a high-speed-railway dedicated network. As illustrated in FIG. 3, the method includes following operations 301 to 307.

In operation 301, a first broadcast message is transmitted to UE. The first broadcast message includes at least one of a preset interval length or a preset cycle length, and also includes a format of the uplink wake-up signal as well as a resource position for transmitting the uplink wake-up signal.

In operation 302, the uplink wake-up signals transmitted at two or more different times by the same UE are received according to the interval length, the cycle length and the resource position.

In operation 303, RRU positional information of each RRU that receives an uplink message is determined according to the uplink wake-up signals transmitted at two or more different times.

In operation 304, it is judged whether a proportion of a number of different pieces of the RRU positional information among at least two pieces of the RRU positional information to a total number of the at least two pieces of the RRU positional information reaches a preset proportion threshold.

In operation 305, the UE is determined as a common UE in response to the proportion not reaching the preset proportion threshold.

In operation 306, the UE is determined as a fast-moving UE in response to the proportion reaching the preset proportion threshold.

In operation 307, a second broadcast message is transmitted to the UE.

The embodiment of the disclosure is about a process of identifying the UE in an idle state.

Figure 4:
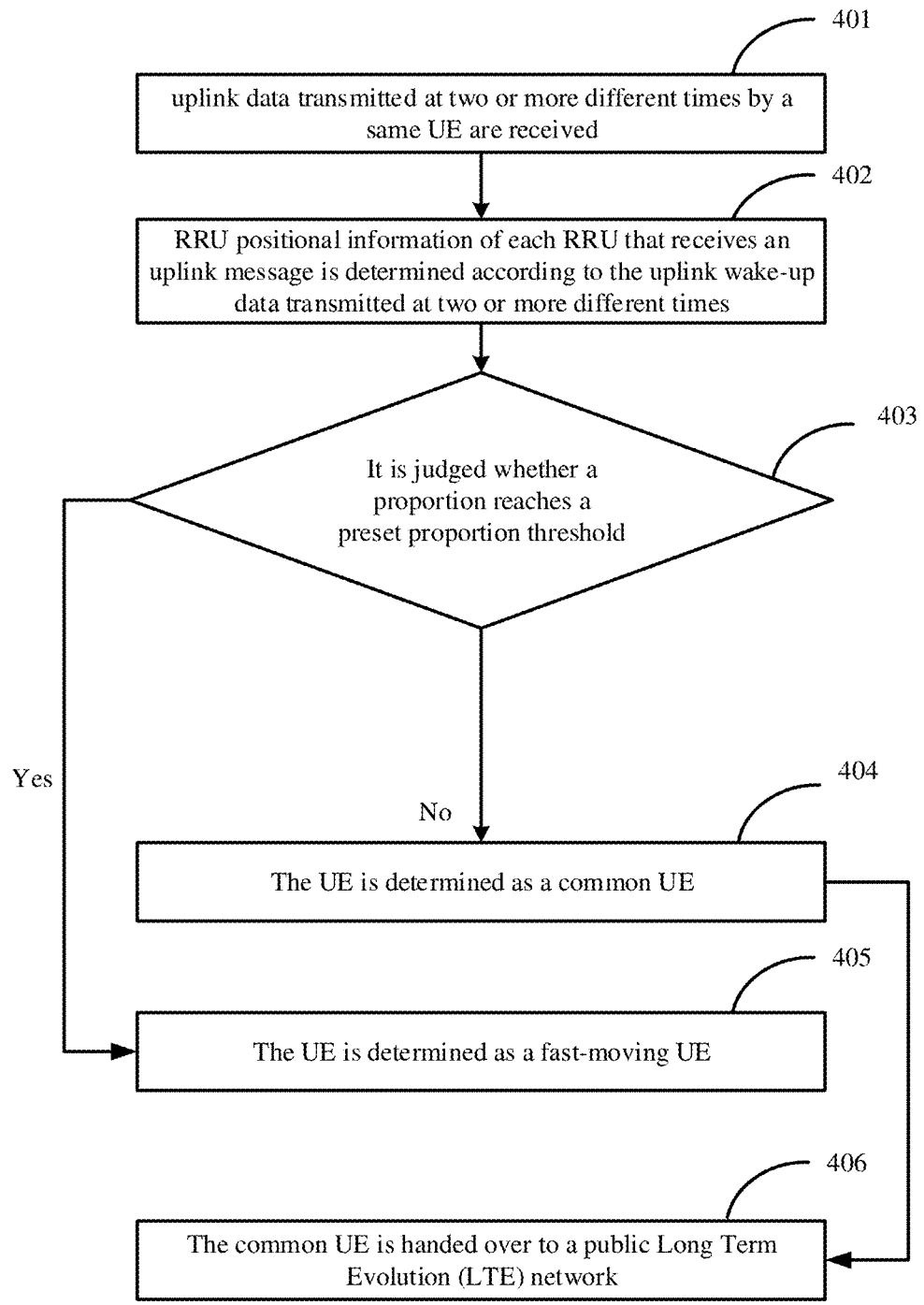
FIG. 4 is a flowchart of a method for identifying UE according to an exemplary embodiment.

FIG. 4 is a flowchart of a method for identifying UE according to an exemplary embodiment. The method for identifying the UE is applied to a base station for a high-speed-railway dedicated network. As illustrated in FIG. 4, the method includes following operations 401 to 406.

In operation 401, uplink data transmitted at two or more different times by the same UE are received.

In operation 402, RRU positional information of each RRU that receives an uplink message is determined according to uplink wake-up data transmitted at two or more different times.

In operation 403, it is judged whether a proportion of a number of different pieces of the RRU positional information among at least two pieces of the RRU positional information to a total number of the at least two pieces of the RRU positional information reaches a preset proportion threshold.

In operation 404, the UE is determined as a common UE in response to the proportion not reaching the preset proportion threshold.

In operation 405, the UE is determined as a fast-moving UE in response to the proportion reaching the preset proportion threshold.

In operation 406, in response to a determination that the UE is common UE, the common UE is handed over to a public LTE network.

The embodiment of the disclosure is about a process of identifying the UE in an activated state.

The above embodiments can be combined at will according to an actual need.

The device embodiments below can be used to implement the method embodiments of the disclosure.

Figure 5:
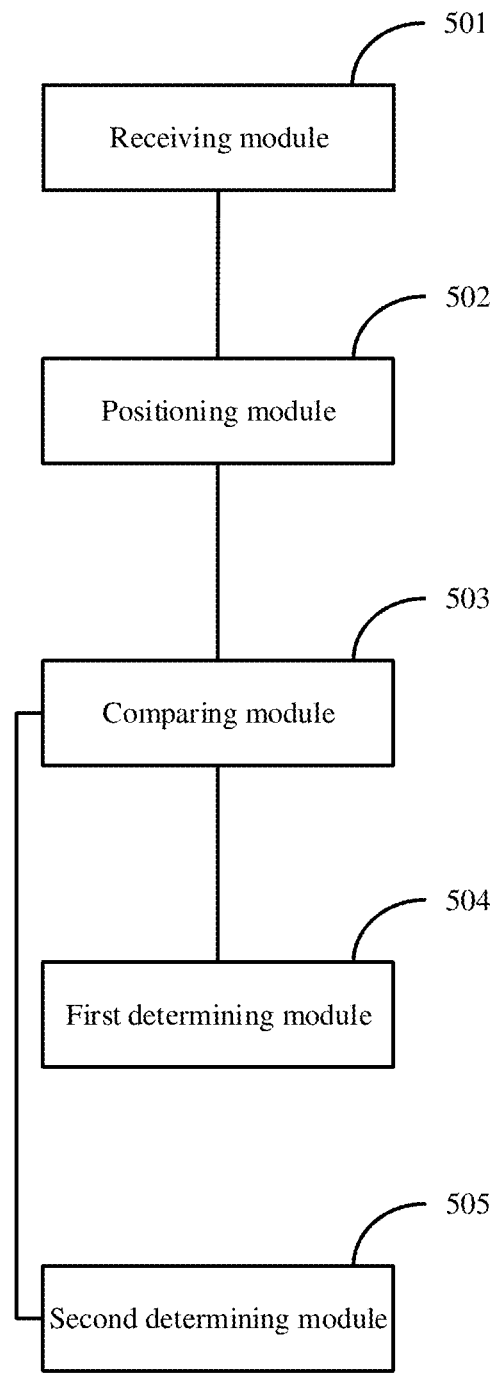
FIG. 5 is a block diagram of a device for identifying UE according to the first specific embodiment.

FIG. 5 is a block diagram of a device for identifying UE according to an exemplary embodiment. The device can be implemented and become a part or all of an electrical device via software, hardware or a combination of the software and the hardware. Referring to FIG. 5, the device for identifying the UE includes a receiving module 501, a positioning module 502, a comparing module 503, a first determining module 504 and a second determining module 505.

The receiving module 501 is configured to receive uplink messages transmitted at two or more different times by a same UE.

The positioning module 502 is configured to determine, according to the uplink messages transmitted at two or more different times, RRU positional information of each RRU that receives an uplink message.

The comparing module 503 is configured to judge whether a proportion of a number of different pieces of the RRU positional information among at least two pieces of the RRU positional information to a total number of the at least two pieces of the RRU positional information reaches a preset proportion threshold.

The first determining module 504 is configured to determine the UE as a common UE in response to the proportion not reaching the preset proportion threshold.

The second determining module 505 is configured to determine the UE as a fast-moving UE in response to the proportion reaching the preset proportion threshold.

In an embodiment of the disclosure, the UE is in an idle state.

Figure 6:
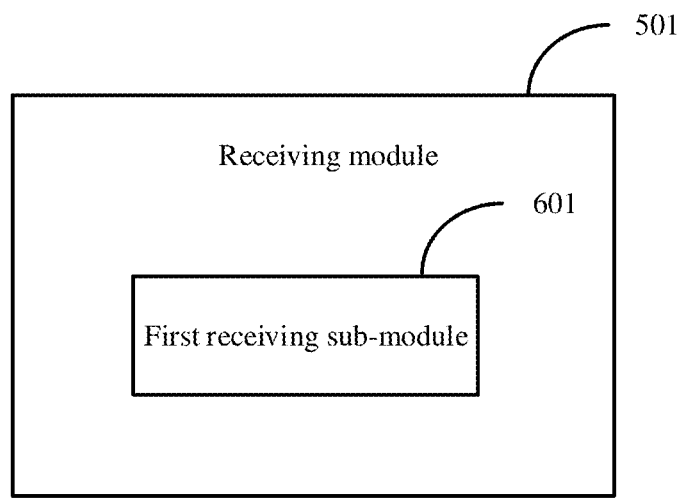
FIG. 6 is a block diagram of a receiving module according to the first specific embodiment.

As illustrated in FIG. 6, the receiving module 501 includes a first receiving sub-module 601.

The first receiving module 601 is configured to receive uplink wake-up signals transmitted at two or more different times by the same UE.

Figure 7:
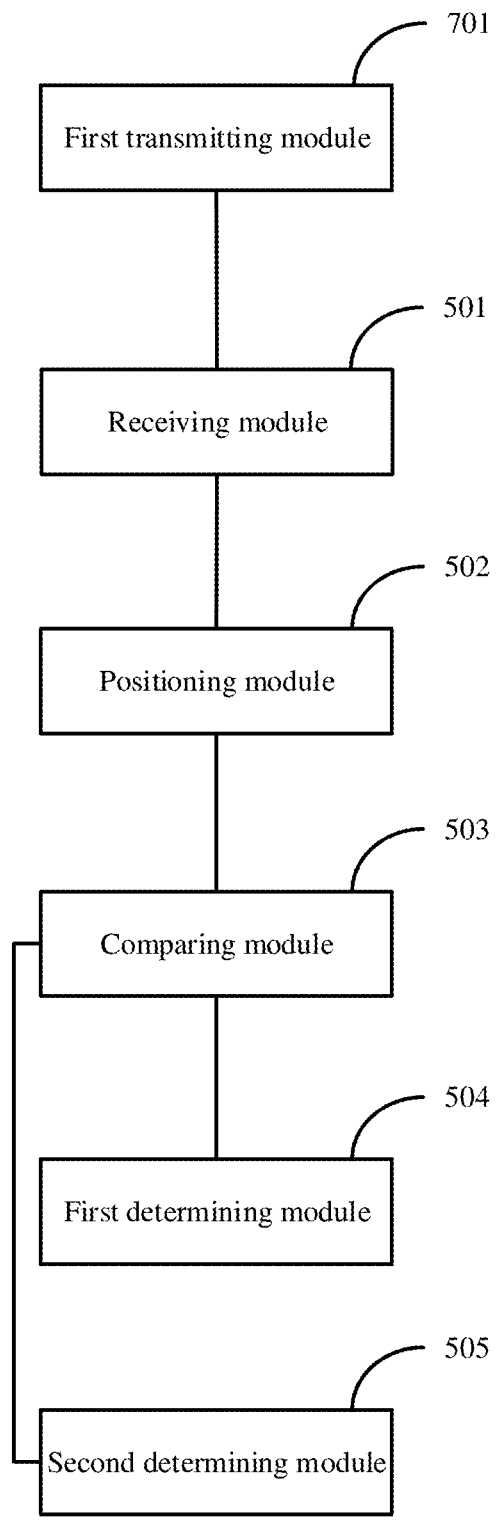
FIG. 7 is a block diagram of a device for identifying UE according to an exemplary embodiment.

As illustrated in FIG. 7, in an embodiment of the disclosure, the device further includes a first transmitting module 701.

The first transmitting module 701 is configured to, before receiving the uplink messages transmitted at two or more different times by the same UE, transmit a first broadcast message to the UE for instructing the UE to transmit the uplink wake-up signal.

In an embodiment of the disclosure, the first broadcast message includes at least one of a preset interval length or a preset cycle length. The interval length is configured to indicate a time interval after expiration of which the UE transmits the uplink wake-up signal, and the cycle length is configured to indicate a cycle period according to which the UE transmits the uplink wake-up signal periodically.

In an embodiment of the disclosure, the first broadcast message includes a format of the uplink wake-up signal and a resource position for transmitting the uplink wake-up signal.

Figure 8:
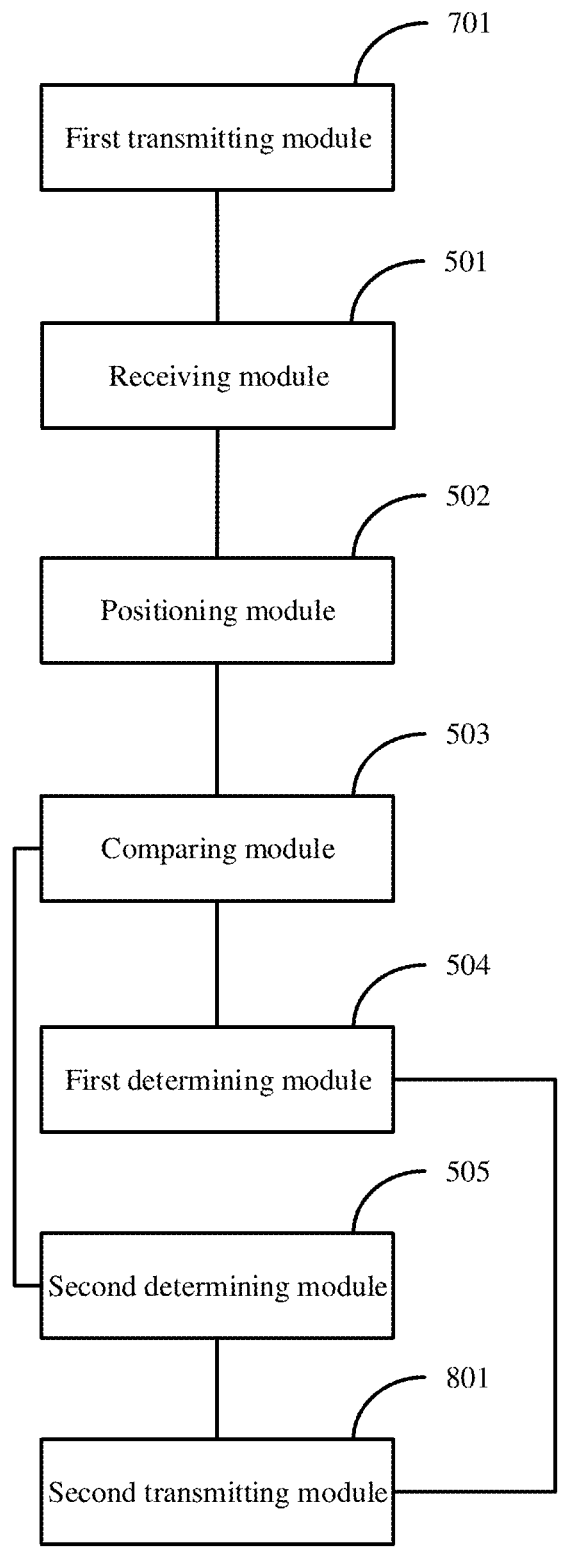
FIG. 8 is a block diagram of a device for identifying UE according to the first specific embodiment.

As illustrated in FIG. 8, in an embodiment of the disclosure, the device further includes a second transmitting module 801.

The second transmitting module 801 is configured to transmit a second broadcast message to the UE for instructing the UE to stop transmitting the uplink wake-up signal.

In an embodiment of the disclosure, the UE is in an activated state.

Figure 9:
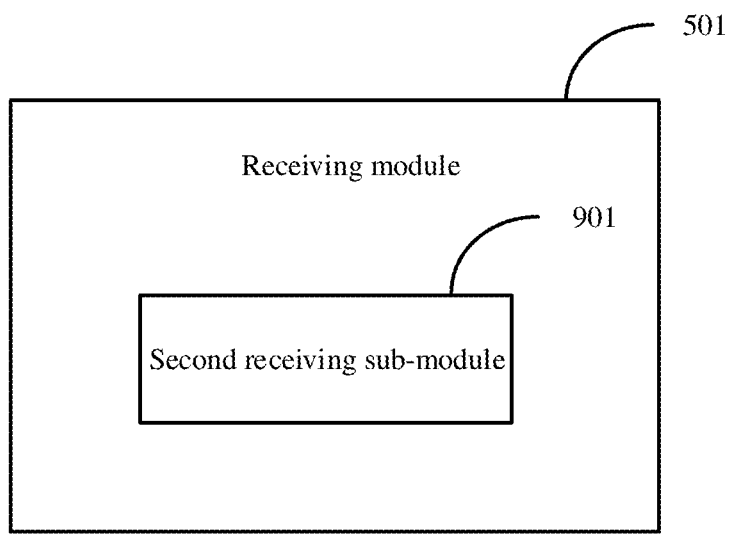
FIG. 9 is a block diagram of a receiving module according to the first specific embodiment.

As illustrated in FIG. 9, the receiving module 501 includes a second receiving sub-module 901.

The second receiving sub-module 901 is configured to receive uplink data transmitted at two or more different times by the same UE.

Figure 10:
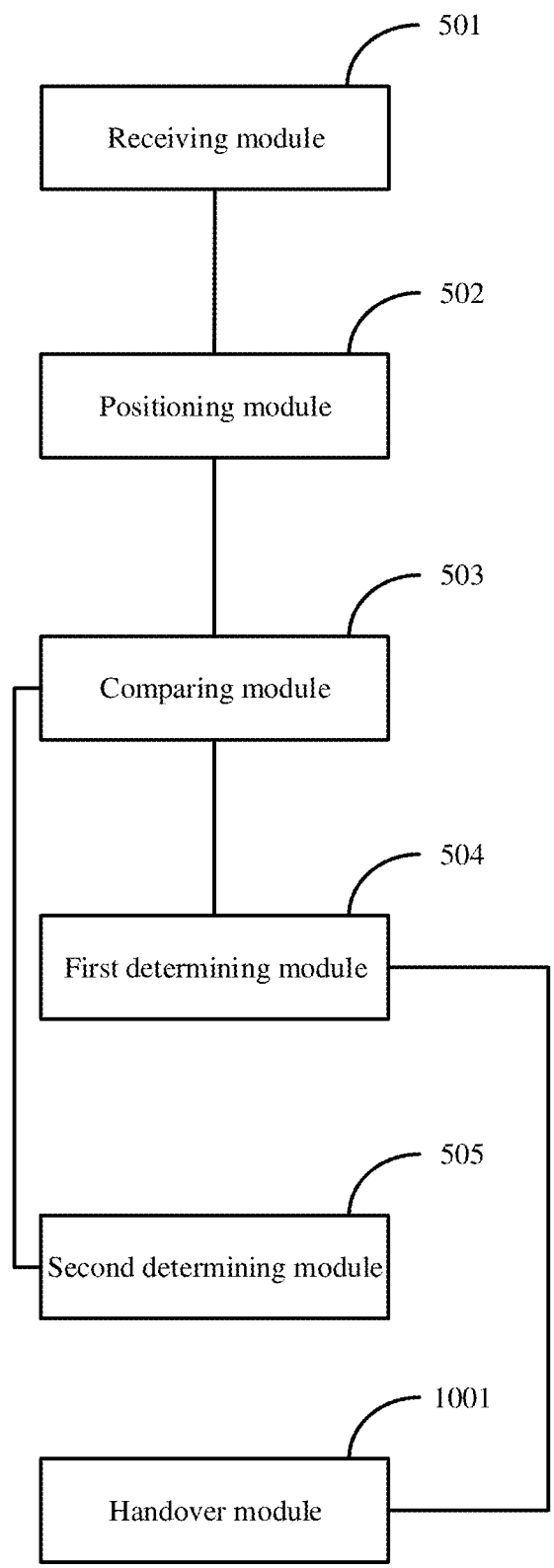
FIG. 10 is a block diagram of a device for identifying UE according to an exemplary embodiment.

As illustrated in FIG. 10, in an embodiment of the disclosure, the device further includes a handover module 1001.

The handover module 1001 is configured to, in response to determining that the UE is common UE, hand over the common UE to a public LTE network.

As to the device according to the above embodiments, detailed operations performed by respective modules in the device are already described in detailed in the embodiments related to the method, and will not be elaborated herein.

In an exemplary embodiment of the disclosure, a device for identifying UE is provided and includes:
a processor;
a memory configured to store instructions executable by the processor.

The processor is configured to:
receive uplink messages transmitted at two or more different times by a same UE;
determine, according to the uplink messages transmitted at two or more different times, RRU positional information of each RRU that receives an uplink message;

judge whether a proportion of a number of different pieces of the RRU positional information among at least two pieces of the RRU positional information to a total number of the at least two pieces of the RRU positional information reaches a preset proportion threshold;
determine the UE as a common UE in response to the proportion not reaching the preset proportion threshold; or
determine the UE as a fast-moving UE in response to the proportion reaching the preset proportion threshold.

The above processor is further configured to perform the following operations:
the UE is in an idle state;
the operation of receiving the uplink messages transmitted at two or more different times by the same UE includes:
uplink wake-up signals transmitted at two or more different times by the same UE are received.

The above processor is further configured to perform the following operations:
before the uplink messages transmitted at two or more different times by the same UE are received, a first broadcast message is transmitted to the UE for instructing the UE to transmit the uplink wake-up signal.

The above processor is further configured to perform the following operations:
the first broadcast message includes at least one of a preset interval length or a preset cycle length, herein the interval length is configured to indicate a time interval after expiration of which the UE transmits the uplink wake-up signal, and the cycle length is configured to indicate a cycle period according to which the UE transmits the uplink wake-up signal periodically.

The above processor is further configured to perform the following operations:
the first broadcast message includes a format of the uplink wake-up signal and a resource position for transmitting the uplink wake-up signal.

The above processor is further configured to perform the following operations:
a second broadcast message is transmitted to the UE for instructing the UE to stop transmitting the uplink wake-up signal.

The above processor is further configured to perform the following operations:
the UE is in an activated state;
the operation of receiving the uplink messages transmitted at two or more different times by the same UE includes:
uplink data transmitted at two or more different times by the same UE are received.

The above processor is further configured to perform the following operations:
in response to determining that the UE is common UE, the common UE is handed over to a public LTE network.

A non-transitory computer-readable storage medium is provided. When instructions in the storage medium are executed by the processor of the device 1200, the device 1200 can execute the above method for identifying the UE. The method includes the following operations.
uplink messages transmitted at two or more different times by a same UE are received;
RRU positional information of each RRU that receives an uplink message are determined according to the uplink messages transmitted at two or more different times;
it is judged whether a proportion of a number of different pieces of the RRU positional information among at least two pieces of the RRU positional information to a total number of the at least two pieces of the RRU positional information reaches a preset proportion threshold;

the UE is determined as a common UE in response to the proportion not reaching the preset proportion threshold; or the UE is determined as a fast-moving UE in response to the proportion reaching the preset proportion threshold.

The instructions in the storage medium can further execute the following operations:

the UE is in an idle state;

the operation of receiving the uplink messages transmitted at two or more different times by the same UE includes:

uplink wake-up signals transmitted at two or more different times by the same UE are received.

The instructions in the storage medium can further execute the following operations:

before the uplink messages transmitted at two or more different times by the same UE are received, a first broadcast message is transmitted to the UE for instructing the UE to transmit the uplink wake-up signal.

The instructions in the storage medium can further execute the following operations:

the first broadcast message includes at least one of a preset interval length or a preset cycle length, herein the interval length is configured to indicate a time interval after expiration of which the UE transmits the uplink wake-up signal, and the cycle length is configured to indicate a cycle period according to which the UE transmits the uplink wake-up signal periodically.

The instructions in the storage medium can further execute the following operations:

the first broadcast message includes a format of the uplink wake-up signal and a resource position for transmitting the uplink wake-up signal.

The instructions in the storage medium can further execute the following operations:

a second broadcast message is transmitted to the UE for instructing the UE to stop transmitting the uplink wake-up signal.

The instructions in the storage medium can further execute the following operations:

the UE is in an activated state;

the operation of receiving the uplink messages transmitted at two or more different times by the same UE includes:

uplink data transmitted at two or more different times by the same UE are received.

The instructions in the storage medium can further execute the following operations:

in response to a determination that the UE is common UE, the common UE is handed over to a public LTE network.

Figure 11:
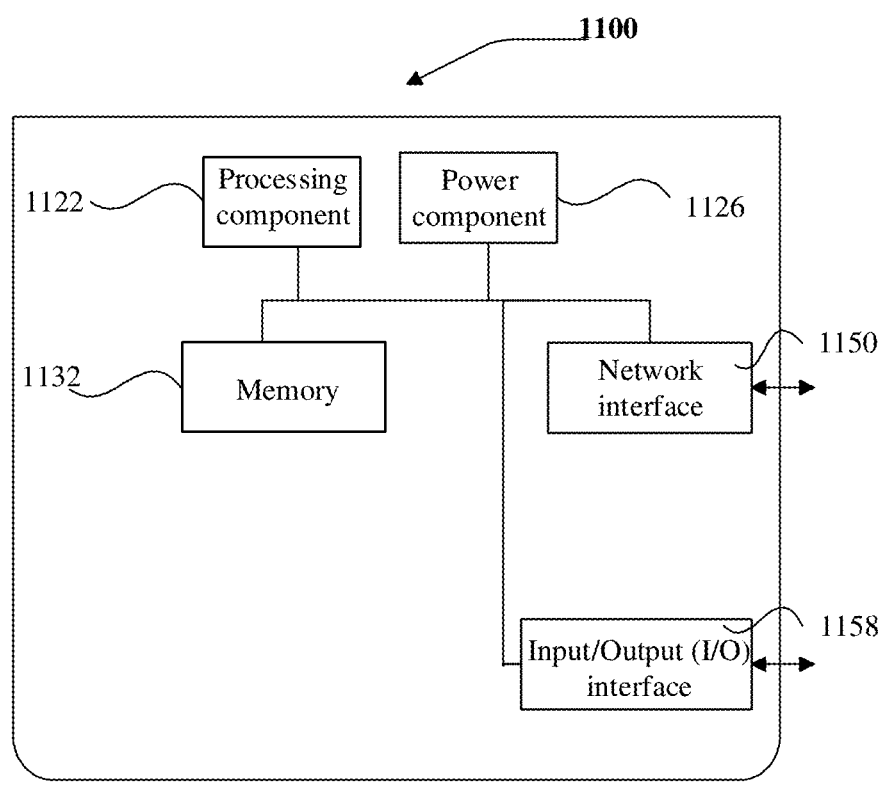
FIG. 11 is a block diagram of a device for identifying UE according to an exemplary embodiment.

FIG. 11 is a block diagram of a device 1100 used for identifying UE according to an exemplary embodiment. For example, the device 1100 may be provided as a base station. Referring to FIG. 11, the device 1100 includes a processing component 1122 and further includes one or more processors and a memory resource represented by a memory 1132, which stores instructions, such as an application, executable by the processing component 1122. The applications stored in the memory 1132 may include one or more modules, each of which corresponds to a set of instructions. Moreover, the processing component 1122 is configured to execute the instructions to perform the above methods to identifying UE.

The device 1100 may further include a power component 1126, which is configured to conduct power management of the device 1100, one wired or wireless network interface 1150, which is configured to connect the device 1100 to a network, and one Input/Output (I/O) interface 1158. The device 1100 can operate an operation system stored in the memory 1132, such as Windows Server™, Mac OS X™, Unix™, Linux™, FreeBSD™ and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It should be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for identifying user equipment (UE), applied to a base station for a high-speed-railway dedicated network, the method comprising:

receiving uplink messages transmitted at two or more different times by a same UE;

determining, according to the uplink messages transmitted at two or more different times, Remote Radio Unit (RRU) positional information of each RRU that receives an uplink message;

judging whether a proportion of a number of different pieces of the RRU positional information among at least two pieces of the RRU positional information to a total number of the at least two pieces of the RRU positional information reaches a preset proportion threshold;

determining the UE as a common UE in response to the proportion not reaching the preset proportion threshold; and determining the UE as a fast-moving UE in response to the proportion reaching the preset proportion threshold, wherein when the UE is in an idle state, the receiving the uplink messages transmitted at two or more different times by the same UE comprises receiving uplink wake-up signals transmitted at two or more different times by the same UE, and the method further comprises transmitting a broadcast message to the UE for instructing the UE to stop transmitting an uplink wake-up signal.

2. The method according to claim 1, wherein the broadcast message is a second broadcast message, and the UE is in the idle state, the method further comprising:

before receiving the uplink messages transmitted at two or more different times by the same UE, transmitting a first broadcast message to the UE for instructing the UE to transmit an uplink wake-up signal.

3. The method according to claim 2, wherein the first broadcast message comprises at least one of a preset interval length or a preset cycle length, wherein the interval length is configured to indicate a time interval after expiration of which the UE transmits the uplink wake-up signal, and the cycle length is configured to indicate a cycle period according to which the UE transmits the uplink wake-up signal periodically.

4. The method according to claim 2, wherein the first broadcast message comprises a format of the uplink wake-up signal and a resource position for transmitting the uplink wake-up signal.

5. The method according to claim 1, wherein when the UE is in an activated state, the receiving the uplink messages transmitted at two or more different times by the same UE comprises:
receiving uplink data transmitted at two or more different times by the same UE.

6. The method according to claim 1, further comprising:
in response to determining that the UE is common UE, handing over the common UE to a public Long Term Evolution (LTE) network.

7. A base station for a high-speed-railway dedicated network, comprising:
a processor; and
a memory storing instructions executable by the processor,
wherein the processor is configured to:
receive uplink messages transmitted at two or more different times by same user equipment (UE);
determine, according to the uplink messages transmitted at two or more different times, Remote Radio Unit (RRU) positional information of each RRU that receives an uplink message;
judge whether a proportion of a number of different pieces of the RRU positional information among at least two pieces of the RRU positional information to a total number of the at least two pieces of the RRU positional information reaches a preset proportion threshold;
determine the UE as a common UE in response to the proportion not reaching the preset proportion threshold; and
determine the UE as a fast-moving UE in response to the proportion reaching the preset proportion threshold,
wherein when the UE is in an idle state, the processor is further configured to receive uplink wake-up signals transmitted at two or more different times by the same UE, and transmit a broadcast message to the UE for instructing the UE to stop transmitting an uplink wake-up signal.

8. The base station according to claim 7, wherein the broadcast message is a second broadcast message, the UE is in the idle state, and the processor is further configured to:
before receiving the uplink messages transmitted at two or more different times by the same UE, transmit a first broadcast message to the UE for instructing the UE to transmit an uplink wake-up signal.

9. The base station according to claim 8, wherein the first broadcast message comprises at least one of a preset interval length or a preset cycle length, wherein the interval length is configured to indicate a time interval after expiration of which the UE transmits the uplink wake-up signal, and the cycle length is configured to indicate a cycle period according to which the UE transmits the uplink wake-up signal periodically.

10. The base station according to claim 8, wherein the first broadcast message comprises a format of the uplink wake-up signal and a resource position for transmitting the uplink wake-up signal.

11. The base station according to claim 7, wherein when the UE is in an activated state, wherein the processor is further configured to:
receive uplink data transmitted at two or more different times by the same UE.

12. The base station according to claim 7, wherein the processor is further configured to:
in response to determining that the UE is common UE, hand over the common UE to a public Long Term Evolution (LTE) network.

13. A non-transitory computer-readable storage medium having stored thereon computer instructions that, when executed by a processor of a base station for a high-speed-railway dedicated network, cause the base station to perform a method for identifying user equipment (UE), the method comprising:
receiving uplink messages transmitted at two or more different times by a same UE;
determining, according to the uplink messages transmitted at two or more different times, Remote Radio Unit (RRU) positional information of each RRU that receives an uplink message;
judging whether a proportion of a number of different pieces of the RRU positional information among at least two pieces of the RRU positional information to a total number of the at least two pieces of the RRU positional information reaches a preset proportion threshold;
determining the UE as a common UE in response to the proportion not reaching the preset proportion threshold; and
determining the UE as a fast-moving UE in response to the proportion reaching the preset proportion threshold,
wherein when the UE is in an idle state, the receiving the uplink messages transmitted at two or more different times by the same UE comprises receiving uplink wake-up signals transmitted at two or more different times by the same UE, and the method further comprises transmitting a broadcast message to the UE for instructing the UE to stop transmitting an uplink wake-up signal.

14. The non-transitory computer-readable storage medium according to claim 13, wherein the broadcast message is a second broadcast message, the UE is in the idle state, and the method further comprises:
before receiving the uplink messages transmitted at two or more different times by the same UE, transmitting a first broadcast message to the UE for instructing the UE to transmit an uplink wake-up signal.

15. The non-transitory computer-readable storage medium according to claim 14, wherein the first broadcast message comprises at least one of a preset interval length or a preset cycle length, wherein the interval length is configured to indicate a time interval after expiration of which the UE transmits the uplink wake-up signal, and the cycle length is configured to indicate a cycle period according to which the UE transmits the uplink wake-up signal periodically.

* * * * *